US007899265B1

(12) United States Patent
Rostami

(10) Patent No.: US 7,899,265 B1
(45) Date of Patent: *Mar. 1, 2011

(54) GENERATING AN IMAGE BY AVERAGING THE COLORS OF TEXT WITH ITS BACKGROUND

(76) Inventor: Sylvia Tatevosian Rostami, Tarzana, CA (US)

( * ) Notice: Subject to any disclaimer, the term of this patent is extended or adjusted under 35 U.S.C. 154(b) by 973 days.

This patent is subject to a terminal disclaimer.

(21) Appl. No.: 11/799,701

(22) Filed: May 1, 2007

Related U.S. Application Data

(60) Provisional application No. 60/796,693, filed on May 2, 2006.

(51) Int. Cl.
*G06K 9/40* (2006.01)
(52) U.S. Cl. ...................... 382/260; 382/254
(58) Field of Classification Search .................. 382/260
See application file for complete search history.

(56) References Cited

U.S. PATENT DOCUMENTS

| 5,379,129 A * | 1/1995 | Othmer et al. | 358/450 |
| 5,802,203 A * | 9/1998 | Black et al. | 382/173 |
| 5,872,573 A * | 2/1999 | Adegeest | 345/621 |
| 6,577,762 B1 * | 6/2003 | Seeger et al. | 382/173 |
| 2005/0169553 A1 * | 8/2005 | Maurer | 382/266 |
| 2006/0023258 A1 * | 2/2006 | Loce et al. | 358/3.2 |
| 2006/0233452 A1 * | 10/2006 | Yang | 382/254 |
| 2007/0133038 A1 * | 6/2007 | Otake et al. | 358/1.14 |

* cited by examiner

*Primary Examiner*—David P Rashid

(57) ABSTRACT

This invention consists of processes that cause the accurate simulation of a target image, pattern, or color by either averaging the colors of text with its adjacent background or by averaging layers of color. In the former, text and the background around or adjacent to the text are selectively colorized such that, when viewed from a distance, the text and background optically blend and average together to accurately simulate the colors and grayscale values of an image. For the latter, this invention demonstrates how the perceived effects of shadows or highlights on a surface are counteracted by applying calculated antidote colors to those effects. It also demonstrates how a starting surface's color can be changed to a target surface's color by applying layers of transparent primary colors to that surface.

12 Claims, 7 Drawing Sheets
(3 of 7 Drawing Sheet(s) Filed in Color)

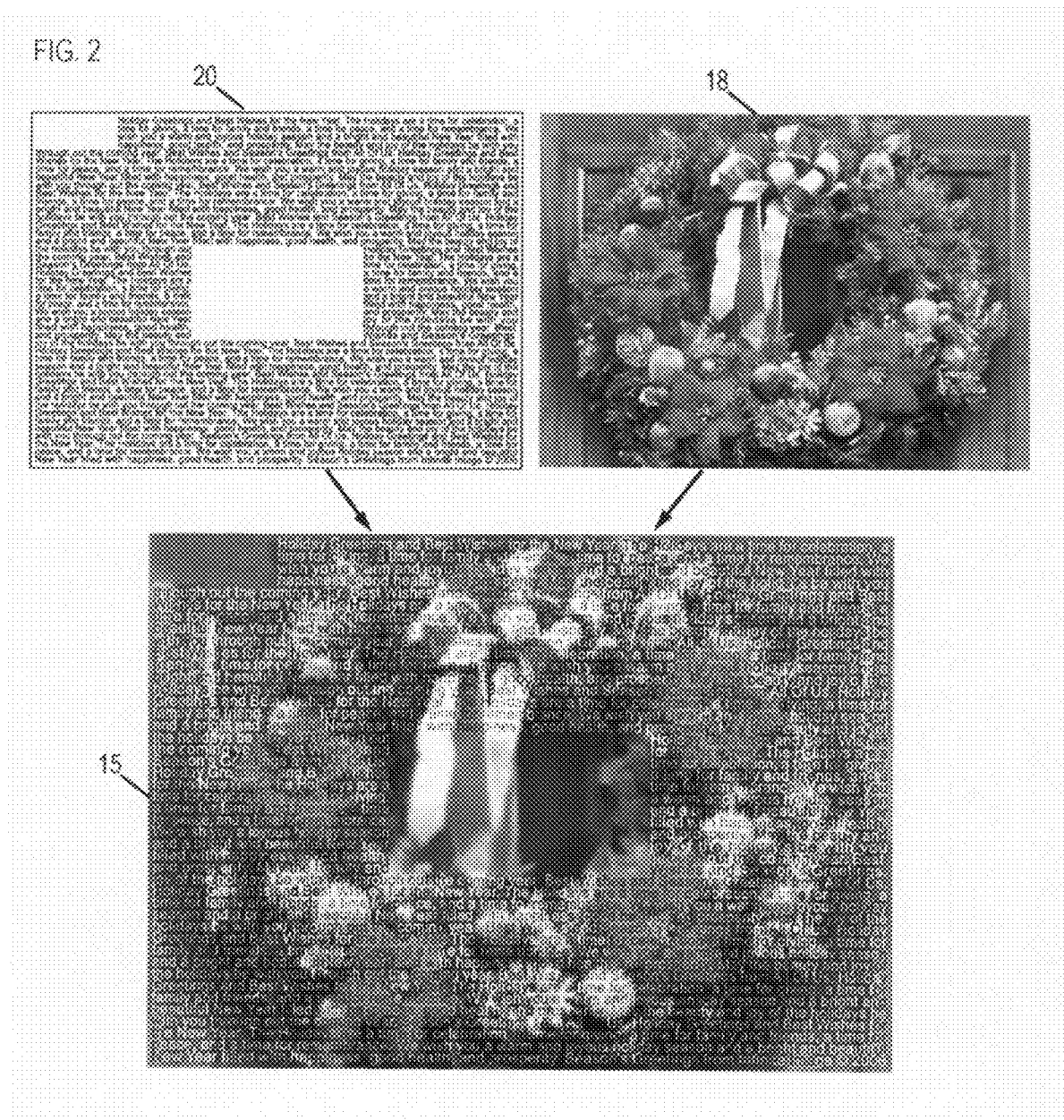

_US 7,899,265 B1_

GENERATING AN IMAGE BY AVERAGING THE COLORS OF TEXT WITH ITS BACKGROUND

CROSS REFERENCE TO RELATED APPLICATIONS

A claim of priority is made to U.S. Provisional Patent application Ser. No. 60/796,693, filed May 2, 2006, entitled: Generation of an Image by Contrasting Text with its Background and the Modification of a Surface's Color Through the Application of Layers of Color.

STATEMENT OF FEDERALLY SPONSORED RESEARCH OR DEVELOPMENT

Not applicable.

REFERENCE TO A SEQUENCE LISTING

Not applicable.

BACKGROUND OF THE INVENTION

An image or a target color can be created either by optically averaging adjacent graphical elements of color, or by averaging layers of color. The generation of an image through the former process has been performed a number of ways in the past. With pointillism, target non-primary colors are approximated by the visual mixing of dots of primary colors placed in close proximity to each other. When viewed from a distance, the dots cannot be distinguished, and blend optically into each other. A similar technique is halftoning for printed media. Halftoning is the process where primary colors combine to approximate all other colors in the gamut of a given color space.

However, the object of pointillism and halftoning is for the larger image to form and for the individual dots that make up the image to be as indiscernible as possible. The object of these techniques is not for the dots to have any meaning or significance other than to contribute to the creation of the image. In halftoning, the primary colors that are used are finite, and very different from each other due to the limitations of printing techniques, not with the intention of making them contrast and be distinguishable from one another. If the goal were to have only two primary colors that are optimally contrasting used to create dots, a very limited and inadequate color gamut would result. Hence, if the goal is for one dot or graphical element to contrast with its adjacent dot to create any target color, both dots must be able to be made up of any color in a color gamut.

ASCII Art is another technique that relates to this invention. With ASCII Art, an image or pattern is formed by laying out different characters in a pattern on a surface based on their size and ink coverage (e.g. the capital "M" is bigger, has more ink coverage, and therefore appears darker than a period "."). While ASCII images make sense visually, their text is gibberish when read, for their arrangement and order is solely for the benefit of the image, and not the text's meaning.

In the past, many images have been created from meaningful text by selectively colorizing text or the background of text. However, such colorizing of text has never been performed such as to accurately replicate a target image's colors through the colorization of the text and its background.

With regard to approximating a target color through the averaging of layers of color, rather than through the averaging of adjacent graphical elements of color, this too has been performed a number of ways in the past. For example, when applying makeup, people apply a thin transparent layer of off-white concealer underneath their eyes to diminish the appearance of redness or dark circles in that region. Thus, they visually approximate the target color of bright normal skin via the combination of the dark brown skin and the transparent off-white concealer. Another technique to undo the darkening effect of shadows on normal colored skin is to apply a layer of opaque or partially transparent lighter colored makeup to that region of the skin. This technique also visually approximates the target normal skin color by combining the shadow darkened skin color with the lighter colored makeup's color. These techniques however, rely only on approximation. There is no formula used in determining what the exact color of the concealer should be, or how opaque or transparent it should be, in order to precisely achieve the target skin color.

BRIEF SUMMARY OF THE INVENTION

This invention consists of processes that cause the accurate simulation of a target image, pattern, or color by either averaging the colors of text with its adjacent background or by averaging layers of color. In the former, text and the background around or adjacent to the text are selectively colorized such that, when viewed from a distance, the text and background optically blend and average together to accurately simulate the colors and grayscale values of an image. In order for the text to be legible, the colors of the characters and their background should be calculated to contrast optimally with one another.

In the case of the latter, perceived coloration of a surface can be influenced by different factors, such as the effects that shadows or bright lighting have on that surface, or the effects that different layers of transparent color have on that surface. This invention demonstrates how the effects of shadows or highlights on a surface are counteracted by applying calculated antidote colors to those effects. It also demonstrates how a starting surface's color can be changed to a target surface's color by applying layers of transparent primary colors to that surface.

BRIEF DESCRIPTION OF THE DRAWING

The patent or application file contains at least one drawing executed in color. Copies of this patent or patent application publication with color drawing(s) will be provided by the Office upon request and payment of the necessary fee.

This invention can be better understood via the following drawings and their descriptions:

FIG. 2 illustrates a Target Image being approximated via a Colorized Work.

DETAILED DESCRIPTION OF THE INVENTION

The Generation of an Image by Contrasting Text with its Background

Figure 1:
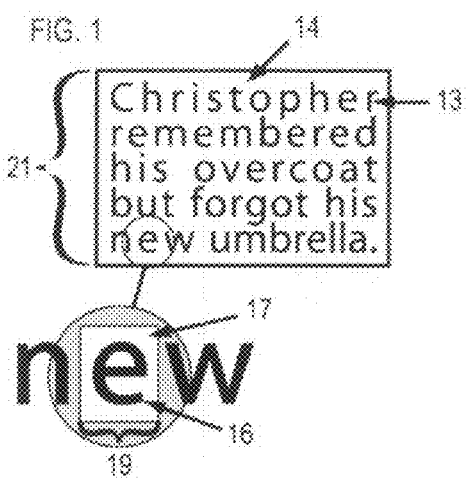
FIG. 1 illustrates the definitions of Work, Text, Background, Character, Character Unit, and Background Unit.

This invention consists of processes that cause Text (FIG. 1, 13) (see definition) and the Background (FIG. 1, 14) (see definition) around or adjacent to the Text to be selectively Colorized (see definition) such that, when viewed from a distance, the Text and Background optically blend and average together to accurately simulate the colors and grayscale values of an image (FIG. 2, 15), pattern, or even a single color. The Characters (FIG. 1, 16) (see definition) and Background Units (FIG. 1, 17) (see definition) of a Work (FIG. 2, 20) (see definition) are Colorized to contrast with each other based on the grayscale and color value of the corresponding areas of a Target Image (FIG. 2, 18). Thus, from a distance, each Character and Background Unit optically blend together, and approximate the target area's color.

The following are definitions of terms that will be used in the specifications and claims:

Text

Text (FIG. 1, 13) can be any kind of graphemes or words in any language's alphabet or writing technique, in any font or writing style. It can also be musical notation. Text can be in any media, including, but not limited to printing and writing on any surfaces, or in computer software that is capable of representing such Text. For the purpose of this invention, Text excludes the background around or adjacent to the Text. Thus, for instance, with black words on a white surface, Text refers only to the black words and not the background white surface. For the purpose of thoroughness, Text can also mean any graphical elements that are placed on a surface. For instance, dots or geometric shapes on a surface can have this same invention applied to them.

Work

A Work (FIG. 1, 21 and FIG. 2, 20) is any surface that contains Text. It can either be a physical surface where text is present, including, but not limited to paper, plastic, metal, wood, etc. Or it can be abstract, such as a surface in computer graphics, including but not limited to an image file, a graphics file, a text file, a surface in a word processing or image processing software, or any other software—where Text is placed. For example, the face of a paper with writing on it, or an image file with Text on it are both Works. For the purpose of this invention, it is preferable, but not necessary to start with a Work that has a maximum of grayscale contrast (i.e. black Text on a white Background, or vice versa).

Background

A Background (FIG. 1, 14) is the area of the Work that excludes the Text.

Character

A Character (FIG. 1, 16) is one grapheme in any language's writing technique, in any font or writing style. It can also be a symbol in musical notation, a dot or geometric shape. The above defined Text is comprised of multiple Characters.

Background Unit

A Background Unit (FIG. 1, 17) is the area immediately adjacent to, or in the immediately vicinity of one Character that excludes the Character. Whatever technique is used to assign the Background Units, there should be no gaps remaining between adjacent Background Units. The Background is comprised of multiple Background Units.

Character Unit

A Character Unit (FIG. 1, 19) consists of one Character and its Background Unit combined. A Work is comprised of multiple Character Units. The boundaries of a Character Unit can be defined many ways, including but not limited to the following: They can be defined by creating a shape in the immediate vicinity of each Character, including, but not limited to a square, rectangle, or diamond. For instance, the left and right borders of the shape can be the midpoint between this Character and its adjacent Character. The top border can be where the line above begins, and the bottom border can be where this line begins. For fixed-width fonts, they can also be defined via a grid, such that each tile in the grid contains a Character and the Background in its immediate vicinity.

Colorization

Colorization means causing a change in color, brightness, or saturation.

Target Image

A Target Image (FIG. 2, 18) is the image or pattern that a Colorized Work (FIG. 2, 15) will be simulating. Thus the Colorization of any subsection of a Work will be performed to best simulate the values of the corresponding subsection of the Target Image. The Target Image may be used to Colorize part of a Work, or it may be that a Work is simulating only part of a Target Image. A Target Image can either be an existing image or pattern, such as an image file, a photograph, drawing, etc., or it can be a conceptual image or pattern that one has in mind as the goal image to be simulated when Colorizing a Work.

Now it becomes clear that it is impossible to represent 100% pure white, 100% pure black, or any primary color via any Character Unit and still maintain a discernible contrast between the Character and Background Unit. That is because representing such a primary color could only be achieved by converting the Character and the Background Unit both into that primary color. Thus, one finds that in order to maintain some contrast between the Character and Background Unit, the Target Image's gamut should be slightly shorter than the Work's gamut. Instead of representing 0 to 100% values, one can, for example, only represent values from 5 to 95% legibly. This means that the Target Image's gamut must be adjusted to fall within the Work's achievable range of legibility. Henceforth, in all discussions of this invention, it will be assumed that this is being performed on all Target Images before starting the Text image creation process, unless if the Target Image's gamut already falls within the achievable gamut of the Work, or unless it is not important to have all the Work legible.

Radius

Figure 3:
FIG. 3 illustrates an example radial area that would be sampled to calculate the average color value to be used for a given pixel.

Radius in this invention will mean half the distance across any shape. Thus, when speaking of a Radius, unless explicitly stated, it will not imply a circular radius (FIG. 3). Rather, the shape that the Radius refers to could include, but not be limited to a square, diamond, octagon, etc. The results of calculations however can only remain accurate if one does not switch from one shape to another while dealing with the subsection of a Work and its corresponding Target Image subsection. To achieve smooth anti-aliasing, none of the values calculated from the sampling should be rounded off to the nearest number.

Brightest Color Value

The Brightest Color Value, hereafter abbreviated as BCV, in this invention will mean the number that is used to represent the brightest value for a color component in an additive color space. For instance, in the 8 bit per component RGB color space, the BCV is 255, which is used to represent the brightest value of any of the red, green, or blue components.

Measuring the Average

Measuring the Average in this invention will mean and include any of the following techniques. It can refer to taking one, multiple, or all the samples of pixels in a given area, and in the case of the multiple or all, calculating the average value of those pixels. Many image processing programs take a weighted or non-weighted average of pixels within a certain area, and refer to this process as 'blurring'. Blurring is also a form of Measuring the Average.

Character Unit Embodiment

For the illustration of this embodiment, a red, green and blue (RGB) color space will be used at 8 bits per component (i.e. with values ranging from 0 to 255 per component). However, similar calculations and conversions in other color spaces with other quantizations and bit depths can be similarly performed, and are also covered under this invention. These include, but are not limited to the RGB, CMY, CMYK, Lab, LUV, YUV, YIQ, YDbDr, YPbPr, YCbCr, xvYCC, Tri-stimulus, CIE XYZ, Natural Color System (NCS), RGK, HSV, HLS, and Munsell, in any bit depth. They can either be performed by deriving the calculations for that color space and quantization, or by simply converting those Works and Target Images into a RGB color space.

The best and simplest embodiment of this invention entails using a Work that has a maximum of grayscale contrast (e.g. black Text and a white Background, or vice versa) and it is this kind of Work that will be used in the invention's explanation below. However, alternative calculations can also be computed using Works that do not necessarily have a maximum of grayscale contrast, but the same principle goal of approximating the target color will still apply and be covered under this invention.

Figure 4:
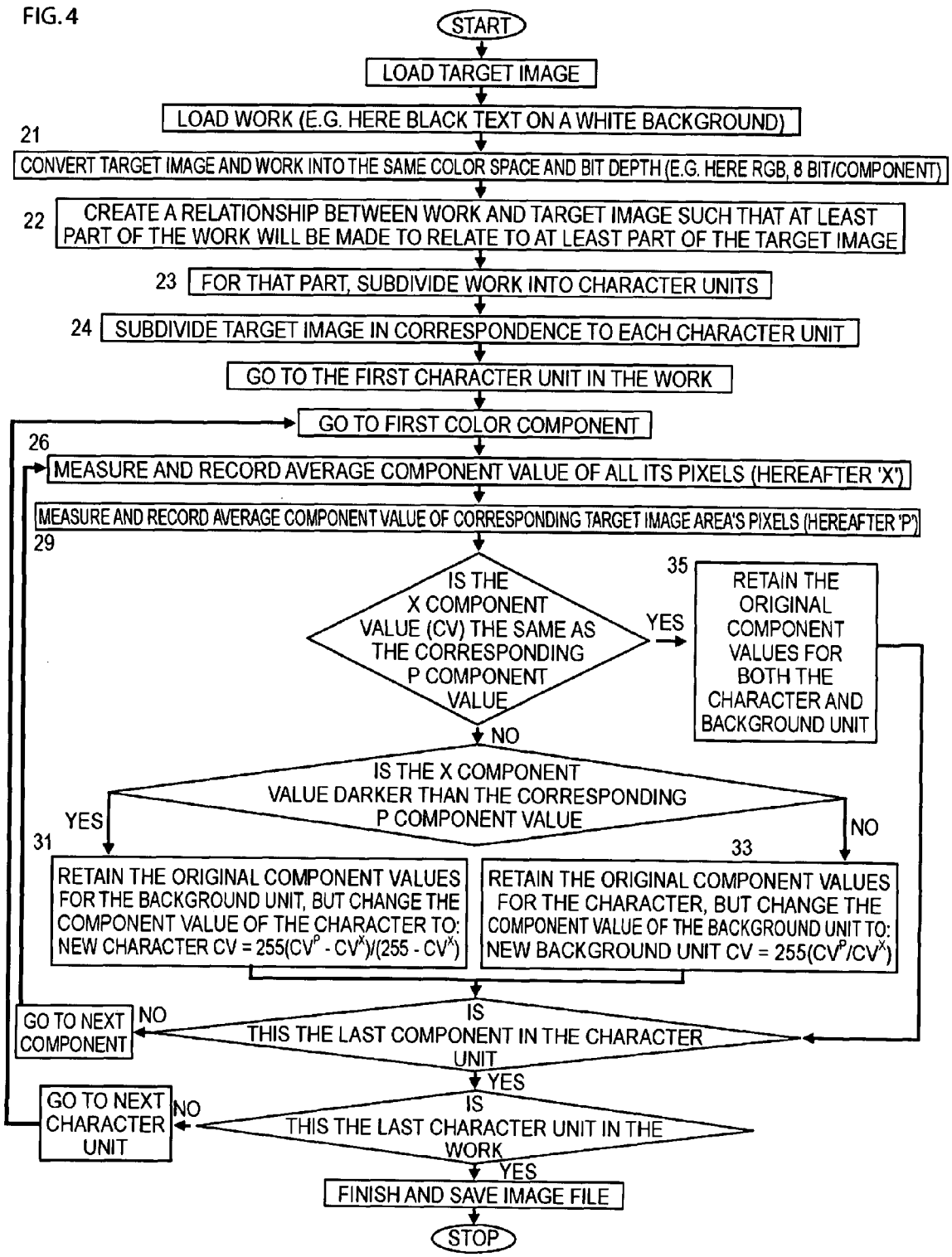
FIG. 4 is a flowchart of the steps involved in generating an image by contrasting Text with its Background one Character Unit at a time.

FIG. 4 is a flow diagram of one embodiment for performing this invention. For the current embodiment, a Work consisting of black Text and a white Background is used in an RGB 8 bit per component color space 21. One first creates a relationship between the Work and a Target Image such that at least part of the Work is made to relate to at least part of the Target Image 22. Then, the Work is broken up into multiple Character Units 23. One then subdivides the Target Image in correspondence to each Character Unit 24. Then one Measures the Average color of that Character Unit (e.g. FIG. 5, 25) preferably by averaging the colors of all the pixels in that Character Unit (26, FIG. 5 27) (hereafter 'X', and denoted as $R^X$, $G^X$, $B^X$). This value of X also now provides us with the knowledge of what fraction of the Character Unit's area is taken up by the white Background Unit: X/255, and what fraction of the Character Unit's area is taken up by the black Character: (255−X)/255. And adding these two areas gives us the whole area of the Character Unit:

$$\frac{X}{255} + \frac{(255-X)}{255} = 1$$

How much of the Character Unit the Character takes up (i.e. (255−X)/255) determines how much influence the Character's color has in the overall average color of the Character Unit, and how much of the Character Unit the Background Unit takes up (i.e. X/255) determines how much influence its color has in the overall average color of the Character Unit.

Then, for each area of the Target Image (FIG. 5, 28) that corresponds to each Character Unit, one Measures the Average color (29, FIG. 5, 30) preferably by taking the average of all the pixels' colors in that area (hereafter referred to as P with components $R^P$, $G^P$, $B^P$).

The goal is to have the Background Unit's color contribution and the Character's color contribution average to give us the target color P:

Background Unit's color contribution+Character's color contribution=P

Thus, it becomes apparent that changing the Background Unit to the color U, and changing the Character to the color A using the following formula will average to give us the target color P:

$$U\frac{X}{255} + A\frac{(255-X)}{255} = P$$

And solving for A and U, one obtains:

$$A = \frac{255P - UX}{255 - X} \quad U = \frac{255P - 255A + AX}{X}$$

However, for each component in A that needs to be lightened to obtain the target color, one knows that the Background Unit U will remain the Brightest Color Value (i.e. 255). Thus, the equation for A above is simplified to (31, FIG. 5, 32):

$$R^A = 255\frac{R^P - R^X}{255 - R^X} \quad G^A = 255\frac{G^P - G^X}{255 - G^X} \quad B^A = 255\frac{B^P - B^X}{255 - B^X}$$

Similarly, for each component in U that needs to be darkened to obtain the target color, one knows that the component in the Character A will remain the darkest possible (i.e. 0). Thus, the equation for U above is simplified to (33, FIG. 5, 34):

$$R^U = 255\frac{R^P}{R^X} \quad G^U = 255\frac{G^P}{G^X} \quad B^U = 255\frac{B^P}{B^X}$$

Figure 5:
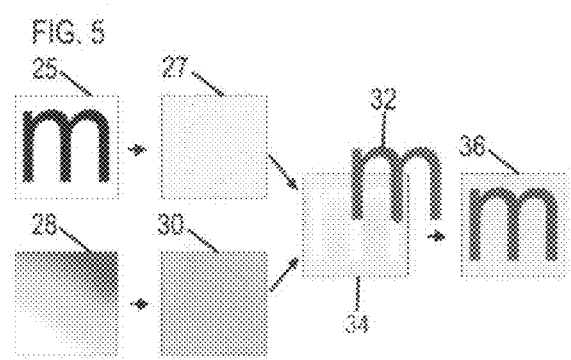
FIG. 5 illustrates how a Character Unit is made to simulate the average color of the corresponding section of the Target Image.

One can determine which components of A and U need to be lightened and darkened respectively by subtracting each component in $R^X$, $G^X$, $B^X$ from the corresponding component in $R^P$, $G^P$, $B^P$, yielding the value $R^Z$, $G^Z$, $B^Z$. For any value in $R^Z$, $G^Z$, $B^Z$ that is positive, the Character in each Character Unit will be lightened as above stated, and the corresponding component in the Background Unit will remain unchanged. For any value in $R^Z$, $G^Z$, $B^Z$ that is negative, the corresponding component in A will remain the same as in the starting Character, but every pixel in the Background Unit U will be darkened as above stated. If any value in $R^Z$, $G^Z$, $B^Z$ is zero, then the corresponding A and U component will remain the same as in the original Character Unit 35. Any pixel that contains both part of the Character and Background Unit will be Colorized based on its fractional area containment of these two. Mathematically and optically, within each Character Unit, all the pixels that have now become A and all the pixels that have now become U average and blend together into the target color P (FIG. 5, 36). The following are examples demonstrating the calculations for the red component of the Character and green component of the Background Unit in FIG. 5:

$$R^X = 185 \quad R^P = 240 \quad R^A = 255\frac{(240-185)}{255-185} = 200$$

$G^X$=185

$G^P$=170

$G^U$=255(170/185)=234

When all the pixels of the Work are Colorized in this way, they will approximate the Target Image.

There are no doubt other mathematical formulas, in this or other color gamuts, to arrive at the color of A and U. However, the goal and novelty of this invention is to compute the selective Colorization of the Text and the selective Colorization of the Background that will optically average and blend to accurately simulate the Target Image.

Though the Colorization of a Work through the above invention will accurately simulate the colors of a Target Image, the ability to accurately display or output this simulation will depend on having whatever display or output media that is being used having the profiles, attributes, and gamma correction settings properly specified and adjusted to accurately display or output the color intensities. With this goal, it is preferable to perform the invention in an absolute color space, or in a color space where it's profiles and attributes are defined.

When there is an unlimited or repeated source of Text, the amount of Text should be based upon the complexity of the Target Image and thus, how much Text will be needed to achieve the desired detail in the resulting approximated image. For instance, a short sentence does not have enough Character Units to effectively approximate a family portrait. Similarly, one does not need the Text of a full length book to approximate a plus sign.

Figure 6:
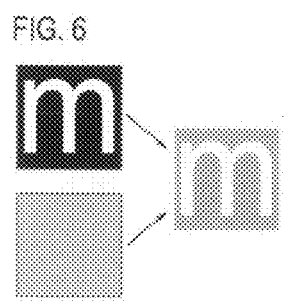
FIG. 6 illustrates how a Character Unit simulates a target color when the Background Unit is dark and the Character is light.

For certain colors, one may also be able to achieve the target color P by Colorizing only the Character or Background Unit (not both). Also, if starting with white Text on a black Background, a similar calculation will apply (FIG. 6). A Work can be comprised of a mixture of these two (FIG. 2, 15). The decision of which Character Units of the Work should consist of dark Characters on light Background Units, and which Character Units should consist of light Characters on dark Background Units should be based on the grayscale of the Target Image. That is because Text generally takes up less area than its Background, such that the predominant grayscale contributor for each Character Unit is the Background Unit. Thus, to optimize contrast (and in the case of legible Text, legibility), in light areas of the Target Image, it is best to have dark Text on a light Background, while in dark areas of the Target Image, it is best to have light Text on a dark Background.

Figure 7:
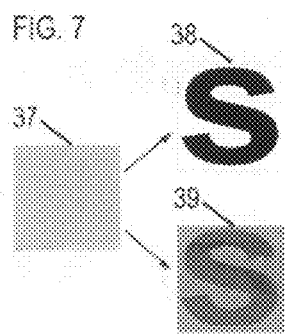
FIG. 7 illustrates how a shade of 50% gray is simulated by contrasting values or by contrasting hues.

Now with the above technique, it should also be noted that, when one is capable of both modifying the Text and its Background, for most colors, a target color can be simulated with many combinations of colors. For instance, as in FIG. 7, if 50% of the Character Unit consists of the Character, and 50% of the Background Unit, then the target color of 50% gray (RGB 127.5, 127.5, 127.5) 37 can be simulated by having the Character be 100% black (0, 0, 0) and the Background Unit be 100% white (255, 255, 255) 38. However, an average color of 50% gray would also be obtained if the Character were pure red (255, 0, 0) and the Background Unit were pure cyan (0, 255, 255) 39. And there are many other combinations of Character and Background Unit colors that would also yield an average of 50% gray. Thus, one can choose if one wants to manipulate a Work to have a maximum of value contrast, the maximum of hue contrast, or many options in between.

Figure 8:
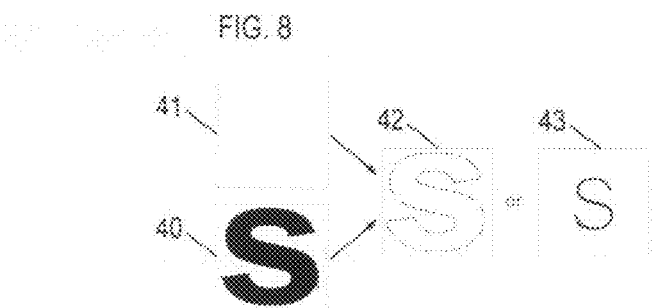
FIG. 8 illustrates how a primary color like white can be simulated by legible text.

Some limitations to this process can be addressed in various ways. For instance, it would be impossible to achieve any target primary color like pure black, white, red, blue, or green in an RGB color space and still be able to read the Text, since with white for example, it would become white Text on a white Background. In such a case, it would become necessary to employ some extra measures that would cause the overall target area's average color to become slightly less primary than the original, in order for the Text to become legible. For instance, in FIG. 8, to have the Character Unit 40 simulate the Target Image's subsection 41, one would want to change the white to be a very light shade of gray. Then, a thin dark outline could be put around the white on white Text 42. Or, in such areas, the Characters could be made as thin and/or small as possible 43 relative to the Background Unit (while still remaining legible), such that even if the Character is made to significantly contrast with the Background Unit, it will be taking up so little area that its color will contribute little to the overall Character Unit's average color. Thus, near primary colors can be simulated via Character Units.

The processes specified in this invention can be performed either manually, or automated via software and computers. The resulting Colorized Works can also be stored in a computer storage medium as image files, or output via printing, etc.

Figure 9:
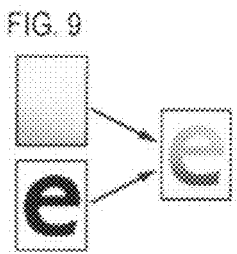
FIG. 9 illustrates how a Character Unit can be Colorized non-uniformly to simulate the different colors in the corresponding section of the Target Image.

Per Pixel Radius Embodiment

Where within a Character Unit, the corresponding area of the Target Image changes in color, two techniques can be used. The color value of the corresponding Target Image's area can be averaged overall as was done above, and the Character and Background Unit approximating that section can be Colorized uniformly to best represent that average value. This technique results in a tiling effect, where every Character Unit makes up a tile. An alternative process can be used where the Character Unit can be modified non-uniformly to best represent the sub-Character Unit modulations in the Target Image (FIG. 9). One way to do this is by Colorizing every pixel (or every few pixels) in the Work independently based on the corresponding area in the Target Image.

Figure 10:
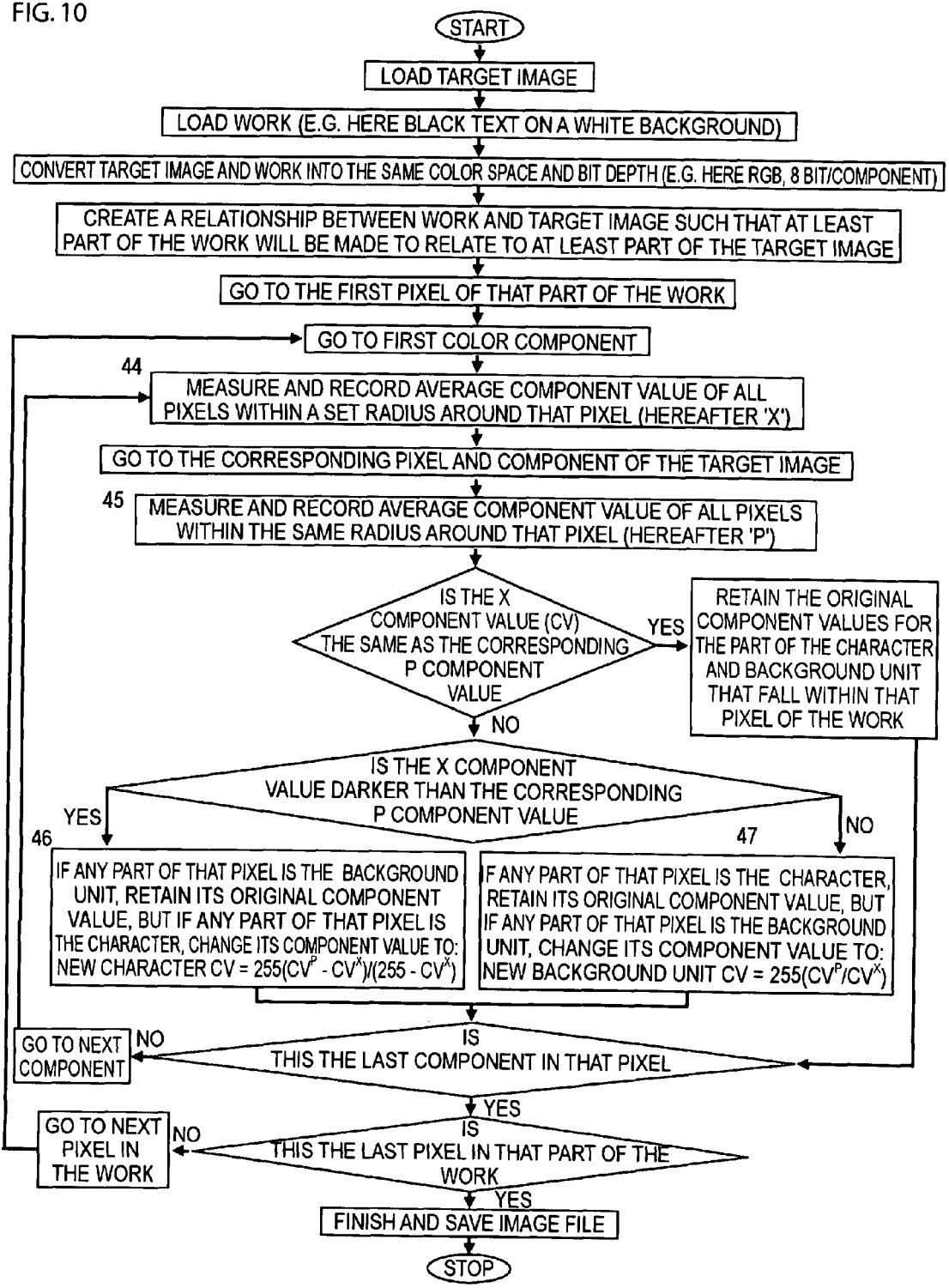
FIG. 10 is a flowchart of the steps involved in generating an image by contrasting Text with its Background one pixel at a time.

FIG. 10 illustrates this embodiment. At any given pixel in the Work, a Radial average (FIG. 3) will be taken of the pixels around that pixel, and the value recorded 44 ($R^{Xr}$, $G^{Xr}$, $B^{Xr}$). To obtain an accurate and usable sampling, the sample area should range anywhere in size from taking up the majority of a Character Unit, to taking up a few Character Units. Similarly, at every corresponding Target Image pixel, a Radial average will be taken of the pixels around that pixel, and the value recorded 45 ($R^{Pr}$, $G^{Pr}$, $B^{Pr}$). Then the same calculations will be performed as before to determine the modification to be performed to each of the Work's pixels 46, 47:

$$R^{Ar} = 255\frac{R^{Pr}-R^{Xr}}{255-R^{Xr}} \quad G^{Ar} = 255\frac{G^{Pr}-G^{Xr}}{255-G^{Xr}} \quad B^{Ar} = 255\frac{B^{Pr}-B^{Xr}}{255-B^{Xr}}$$

$$R^{Ur} = 255\frac{R^{Pr}}{R^{Xr}} \qquad G^{Ur} = 255\frac{G^{Pr}}{G^{Xr}} \qquad B^{Ur} = 255\frac{B^{Pr}}{B^{Xr}}$$

If a fraction of a pixel is made up of the Character, and a fraction of the Background Unit, then these fractions will be determined and used to appropriately adjust the Colorization of that pixel. When all the pixels of the Work are Colorized in this way, they will approximate the Target Image.

The Modification of a Surface's Color through the Averaging of Layers of Color

A Target Image, pattern, or color can not only be simulated through the optical averaging of multiple adjacent graphical elements of color, as was discussed above, but also through the averaging of layers of color. Perceived coloration of a surface can be influenced by different factors, such as the effects that shadows or bright lighting have on that surface, or the effects that different layers of transparent color have on that surface. The following inventions address both of these factors.

Counteracting the Effects of Shadows or Highlights on a Surface Embodiment

Figure 11:
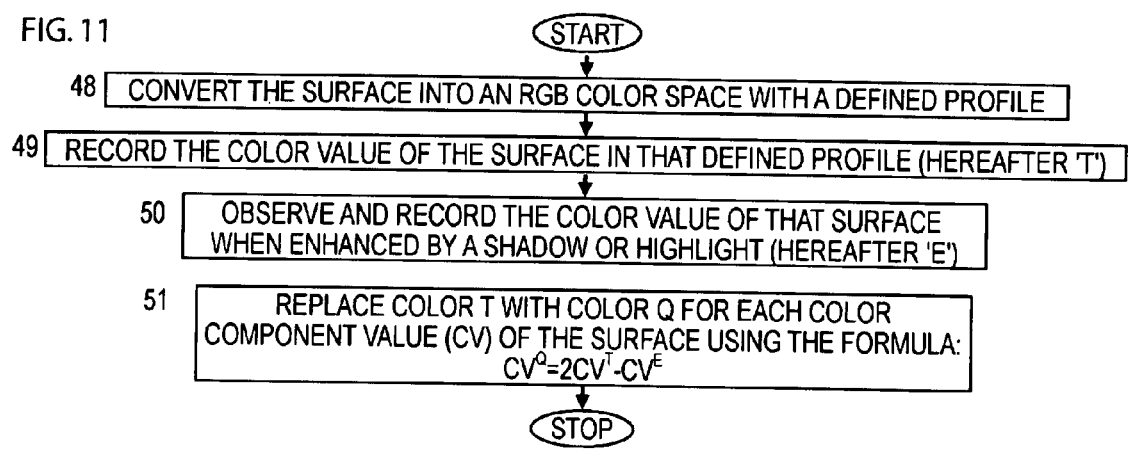
FIG. 11 is a flowchart of the steps involved in counteracting the effects of shadows or highlights on a surface
Figure 12:
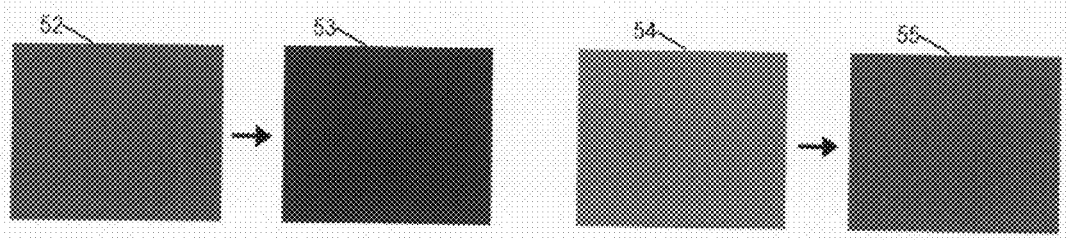
FIG. 12 illustrates the counteracting of the effects of shadows or highlights on one color.

This version of the target color application addresses counteracting the effects of shadows or highlights on a surface through the application of color. Again, an eight bit depth RGB color space will be used to demonstrate the best embodiment of this invention, but similar calculations can be derived and applied to any color space and bit depth, and should be considered as included in this invention. FIG. 11 illustrates this embodiment. First, one obtains the component values 49 of a surface's original color (FIG. 12, 52) (hereafter T ($R^T G^T B^T$) in any absolute color space, or in a non-absolute color space with a defined profile (in this example, RGB in 8 bit depth 48). This surfaces color T, that through shadows or highlights, has been made to appear color E 50 and FIG. 12, 53 ($R^E G^E B^E$), can be made to appear like T again (FIG. 12, 55) if the 'antidote' of the shadow or highlight's effect (FIG. 12, 54) (i.e. color Q ($R^Q G^Q B^Q$)) is applied to it:

Color $Q$=Original Color ($T$)+The difference that the highlight or shadow caused $T$ And the difference that the highlight or shadow caused to T is simply:

Difference=Original Color ($T$)−The color that appears due to the shadow or highlight ($E$)

Thus, by combining these two formulas, Q can be calculated via the following formula:

$Q=T+(T-E)$

And when simplified and broken up into each component, one arrives at the following formulae 51:

$$R^Q=2R^T-R^E$$

$$G^Q=2G^T-G^E$$

$$B^Q=2B^T-B^E$$

In this way, when the color Q is applied to the surface, Q and the effect of the shadow or highlight average together to yield the target color T. The following is an example of these formulas applied (FIG. 12):

$T$=(38,180,145)

$E$=(27,126,101)

$R^Q$=2(38)−27=49

$G^Q$=2(180)−126=234

$B^Q$=2(145)−101=189

$Q$=(49,234,189)

Figure 13:
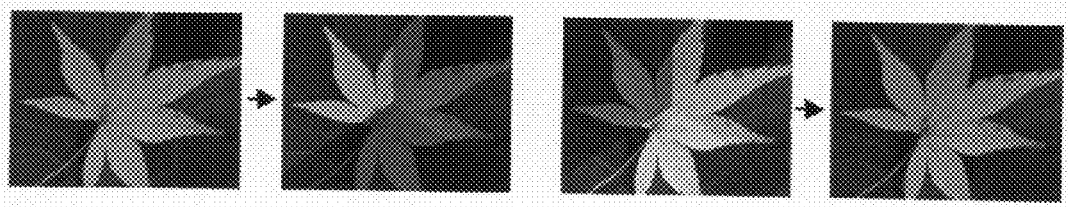
FIG. 13 illustrates the counteracting of the effects of shadows or highlights on an image.

One must however ascertain how much of surface T appears lightened or darkened due to shadows or highlights, and how much of surface T appears lightened or darkened due to the actual color on the surface. Hence, on a surface of varying coloration, like an image or pattern (FIG. 13), two techniques can be employed. One technique entails knowing what the image or pattern on the surface was in any absolute color space prior to what it now looks like in the same absolute color space. The other technique entails first coloring the entire surface color T, and then observe what is the color E that appears in the shadow or highlighted areas. And then the same formula for determining the color to be applied to obtain the appearance of color T (namely color Q) can be applied again as above for each pixel or subsection of the image or pattern.

There are some limitations to this process. For instance, consider a room, where the white paint on the wall can be said to have RGB values of 255,255,255, with the highest brightness enhancement chemicals having been applied to it. In the corner of such a room, where there are shadows, it would be impossible to remove such shadows via painting the corner because there is no color brighter than the paint that is already there. To remove the shadows in the corner of that room, one would need to have the brightest areas of the wall that are not being darkened through the shadow painted to be the same color as the darkest color currently observed in the corner shadow.

Averaging Transparent Layers Embodiment

The following is a different embodiment of the target color application, where a surface with a given color (S), represented as $R^S G^S B^S$ can be Colorized to achieve a target color F, represented as $R^F G^F B^F$ through the application of different layers of additive and subtractive primary color with different amounts of transparency. As the best embodiment, the following calculations are based on using the least amount of transparent coloration to achieve the target color F. However, if this is not the objective, modifications of the formulas can apply.

Figure 15:
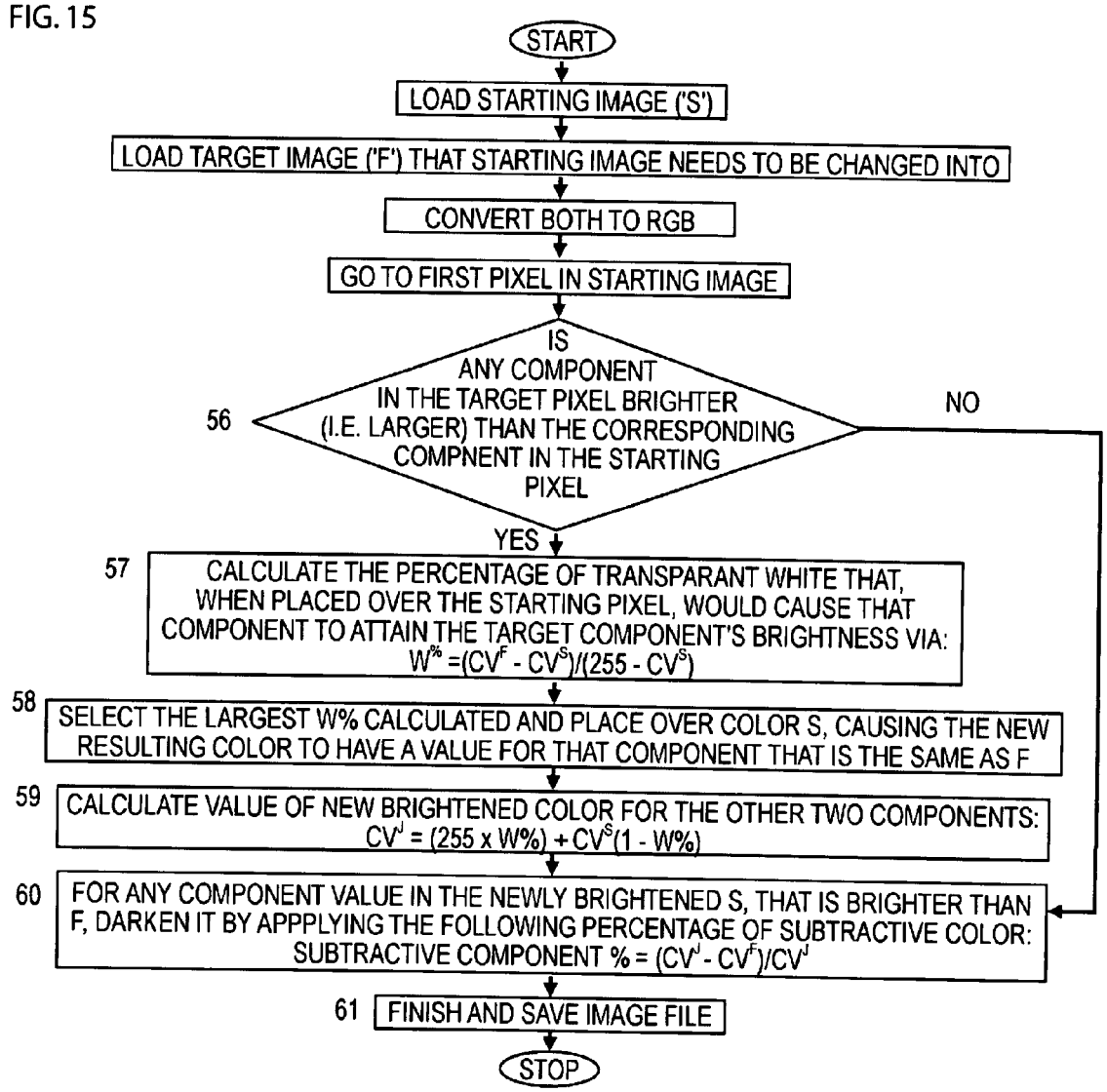
FIG. 15 is a flowchart of the steps involved in the transparent layers embodiment.

FIG. 15 illustrates this embodiment. First an analysis will be done to see which component, if any, of color F is brighter than the corresponding component of color S 56. This will simply be performed by subtracting each component value of color S from the corresponding component value of color F, and seeing if, in the resulting three numbers, represented as $R^D$, $G^D$, $B^D$, any of them is positive. If any of the three are positive, then the following calculations will be performed.

First, the percentage of white that would be needed for each component in S to be brightened to the F value will be calculated via the following formula 57:

$$W^{\%R} = \frac{R^F - R^S}{255 - R^S} \quad W^{\%G} = \frac{G^F - G^S}{255 - G^S} \quad W^{\%B} = \frac{B^F - B^S}{255 - B^S}$$

The highest $W^\%$ calculated above will be selected 58. Then, a layer of pure white, with RGB components of 255,255,255, will be layered on top of the $R^S G^S B^S$ color with that percentage of transparency. For this explanation's example, we can say that it is the $W^{\%R}$.

Once this percentage of white is layered on top of the $R^S G^S B^S$ color, the combination of the two colors will yield a new color called $R^J$, $G^J$, $B^J$, where in this example, the $R^J$ component will now be equal to $R^F$.

Then, to determine what value the other two components of $R^J$, $G^J$, $B^J$ now have, namely in this example $G^J$ and $B^J$, one adds the proportionate influence of the two layers using the following formula 59:

$$G^J = (255 \times W^{\%}) + G^S(1 - W^{\%}) \text{ and}$$

$$B^J = (255 \times W^{\%}) + B^S(1 - W^{\%})$$

3. Lastly, to achieve the last two target components, in this example $G^F$ and $B^F$, the $G^J$ and $B^J$ must be darkened. Since cyan, magenta, and yellow darken red, green, and blue respectively, a layer of transparent magenta, with a calculated percentage of transparency ($M^\%$) and a layer of transparent yellow, with a calculated percentage of transparency ($Y^\%$) will then be placed on the already existing layers of transparent white and color S. The following formula will be used to calculate the percentage of transparency for each component 60:

$$M^\% = \frac{G^J - G^F}{G^J} \quad Y^\% = \frac{B^J - B^F}{B^J}$$

The resulting color of the combination of all these layers will be the target color F, with components $R^F G^F B^F$. We have thus combined the influence of multiple layers of color together in order to achieve the target color.

If, after performing the analysis to see which component of color F is brighter than the corresponding component of color S, it is found that none of the components is brighter, then three transparent layers of cyan, magenta and yellow will be placed upon color S, with the transparency percentage calculated in the same way as above:

$$C^\% = \frac{R^J - R^F}{R^J} \quad M^\% = \frac{G^J - G^F}{G^J} \quad Y^\% = \frac{B^J - B^F}{B^J}$$

If any of the components in color S is found to equal the corresponding component in color F, then no corresponding transparent subtractive layer will be created for that component.

Figure 14:
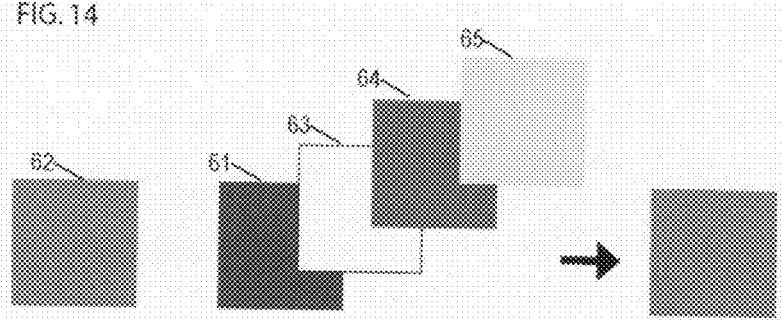
FIG. 14 illustrates a sample target color being obtained by transparent layers

The following is an example of these formulas applied (FIG. 14):

$S61 = (119, 81, 3)$ $F62 = (176, 115, 106)$ $W^{\%R}63 = (176-119)/(255-119) = 0.42$ $W^{\%G} = (115-81)/(255-81) = 0.20 \, W^{\%B} = (106-3)/(255-3) = 0.41$ $G^J = (255 \times 0.42) + 81(1-0.42) = 154$ and $B^J = (255 \times 0.42) + 3(1-0.42) = 109$ $M^\%64 = (154-115)/154 = 0.25 = 25\%$ and $Y^\%65 = (109-106)/109 = 0.3 = 3\%$ These techniques can also be applied to a uniformly colored surface, or on a surface with an image. There are no doubt other mathematical formulas, in this or other color gamuts, to arrive at the target color. However, the goal and novelty of this invention is to compute the exact coloration of the surface necessary to achieve the target color.

Also, the application of color in this invention can entail the physical application of color like paint, ink, etc. to a surface, or it can be abstract, as in computer graphics or a software program where such color manipulations can be represented. Similarly, the surface(s) can be physical or abstract, and the calculations can be performed either manually, or be automated through a software program.

What is claimed is:

1. A method for generating an image from text in any color space and with any color depth with an appearance that simulates a target image, using a computer and a computer readable medium that contains software which cause a computer to perform the steps of:
   creating a relationship between a work and a target image such that at least part of the work will be made to relate to at least part of the target image;
   subdividing that part of the work into subsections such that in the region of each subsection, a sampling can be taken which can range in size from the majority of a character unit to a few character units;
   subdividing that part of the target image into subsections that correspond to each of the subsections created in the work, and in the region of which the same corresponding area sampling can be taken as was taken in the work;
   measuring the average values of each color component within each sample of the work;
   measuring the average values of each color component within each corresponding sample of the target image;
   wherein for each subsection and each color component between the work and target image, (i) if the average value from the target image's sample is darker than the corresponding average value from the work's sample, then within that subsection, darkening whichever of the character or background unit is brighter than the other such that, when combined with any other colorized subsections' value that influence that sample's average, the average color component value within that sample of the work equals the average color component value within the corresponding sample in the target image;
   (ii) if the average value from the target image's sample is brighter than the corresponding average value from the work's sample, then within that subsection, brightening whichever of the character or background unit is darker than the other such that, when combined with any other colorized subsections' value that influence that sample's average, the average color component value within that sample of the work equals the average color component value within the corresponding sample in the target image;

(iii) if the average value from the target image's sample is equal to the corresponding average value from the work's sample, then keep that subsection's character and background unit component value the same as it originally was in the work;

colorizing all subsections of the work that are corresponding to the target image until from a distance, when the colorized text and background optically blend and average together, they will simulate the color values of the target image and thus simulate the target image;

and wherein the new work image is stored on a non-transitory computer storage medium.

2. The method of claim 1 including the further step of each subsection being only one or a few pixels, and the sampling consisting of the area around the pixel within a given radius.

3. The method of claim 1 including the further step of each subsection and sampling area being one character unit.

4. The method of claim 1 including the further step of, if the average from the target image's sample is darker than the corresponding average from the work's sample, using the following formula to calculate, in an additive color space, how much to darken whichever of the character or background unit is the brightest in that subsection:

$$\text{new value} = \text{brightest color value (target image's average value/work's average value)}.$$

5. The method of claim 1 including the further step of, if the average from the target image's sample is brighter than the corresponding average from the work's sample, using the following formula to calculate, in an additive color space, how much to brighten whichever of the character or background unit is the darkest in that subsection:

$$\text{new value} = \text{brightest color value (target image's average value} - \text{work's average value)/(brightest color value} - \text{work's average value)}.$$

6. The method of claim 1 including the further step of colorizing only the text or only the background, but not both.

7. The method of claim 1 including the further step of colorizing the text and background to contrast in grayscale value.

8. The method of claim 1 including the further step of colorizing the text and background to contrast in hue value.

9. The method of claim 1 including the further step of having a work in which some characters are light relative to their background unit, and some characters are dark relative to their background unit.

10. The method of claim 1 including the further step of thickening, thinning, scaling or converting into an outline at least one character in the work to aid in better simulating the target image's color while optimizing distinguishability between the character and its background unit.

11. The method of claim 1 including the further step of colorizing each character non-uniformly to best approximate modulations in color within each target image subsection.

12. The method of claim 1 including the further step of, if any pixel in the work contains both part of the character and background unit, then colorizing that pixel based on its fractional area containment of the character and background unit.

* * * * *